United States Patent

[11] 3,603,209

| [72] | Inventors | Stanley I. MacDuff<br>Dayton Beach, Fla.;<br>Richard L. Lewis, South Bend, Ind. |
|---|---|---|
| [21] | Appl. No. | 793,923 |
| [22] | Filed | Jan. 16, 1969 |
| [45] | Patented | Sept. 7, 1971 |
| [73] | Assignee | The Bendix Corporation |

[54] HYDRAULIC BRAKE BOOSTER
14 Claims, 3 Drawing Figs.

[52] U.S. Cl. .................................................... 91/391, 91/434, 91/452
[51] Int. Cl. ........................................................ F15b 13/10, F15b 13/14
[50] Field of Search ............................................ 91/391, 434, 452

[56] References Cited
UNITED STATES PATENTS

| 2,766,732 | 10/1956 | Schultz.......................... | 91/384 |
| 2,976,849 | 3/1961 | Stelzer........................... | 91/391 |
| 3,012,546 | 12/1961 | Heintzmann et al........... | 91/452 |
| 3,093,120 | 6/1963 | Ayers, Jr. ....................... | 91/391 |
| 3,143,928 | 8/1964 | Wahlstrom..................... | 91/391 |
| 3,173,339 | 3/1965 | Larsen........................... | 91/391 |
| FOREIGN PATENTS | | | |
| 1,105,351 | 3/1968 | Great Britain................. | 91/391 |

*Primary Examiner*—Paul E. Maslousky
*Attorney*—Plante, Hartz, Smith and Thompson

ABSTRACT: A means to control the use of hydraulic pressure on a piston having a valve element with an adjustable pilot-type relief valve to permit limiting of maximum boost pressure and which is actuatable by a means linked also to the piston so that reduced travel is permitted for power operation and a predetermined mechanical advantage is available for manual actuation of said piston by simple follow through motion.

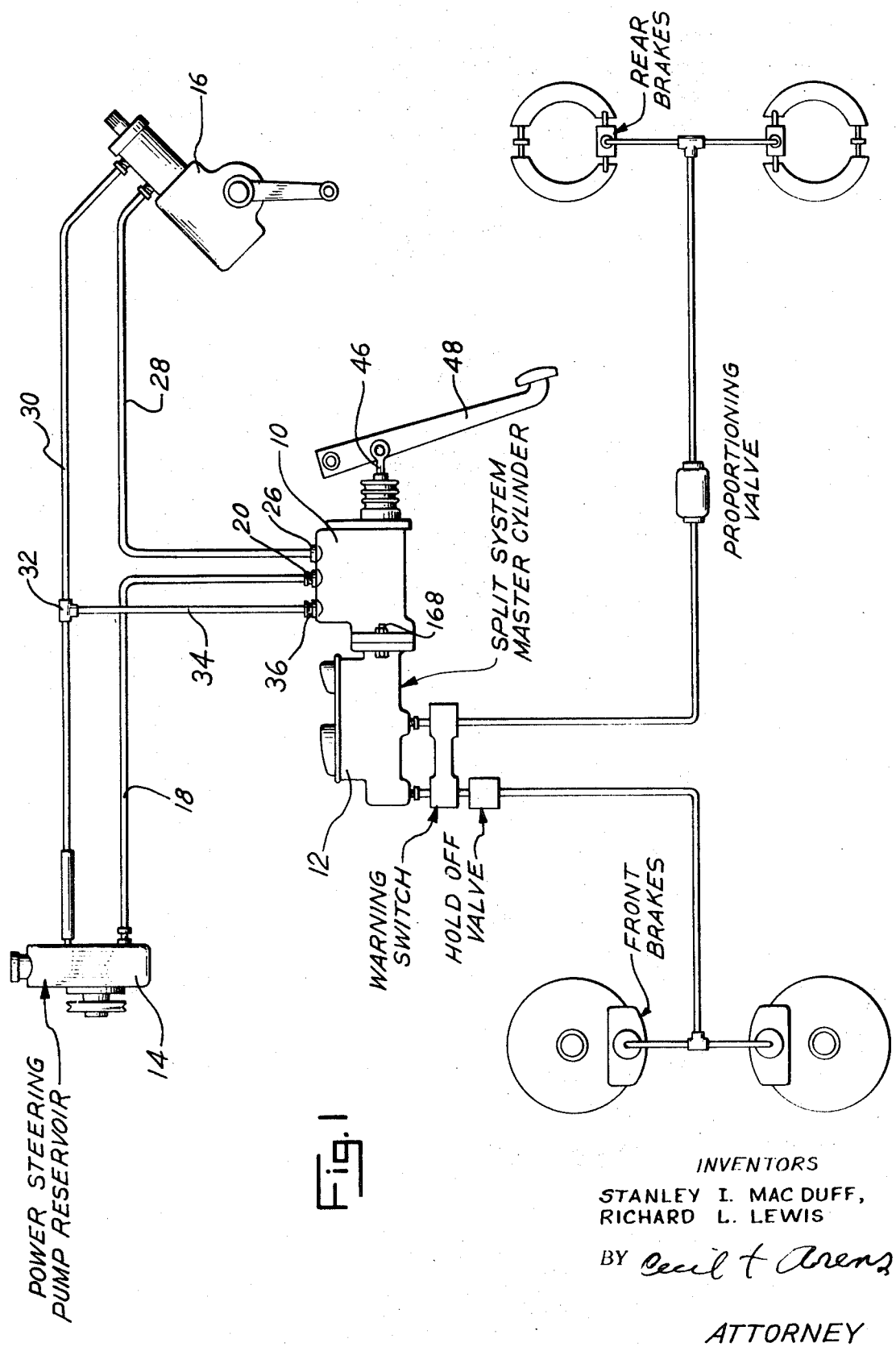

PATENTED SEP 7 1971
3,603,209
SHEET 2 OF 2
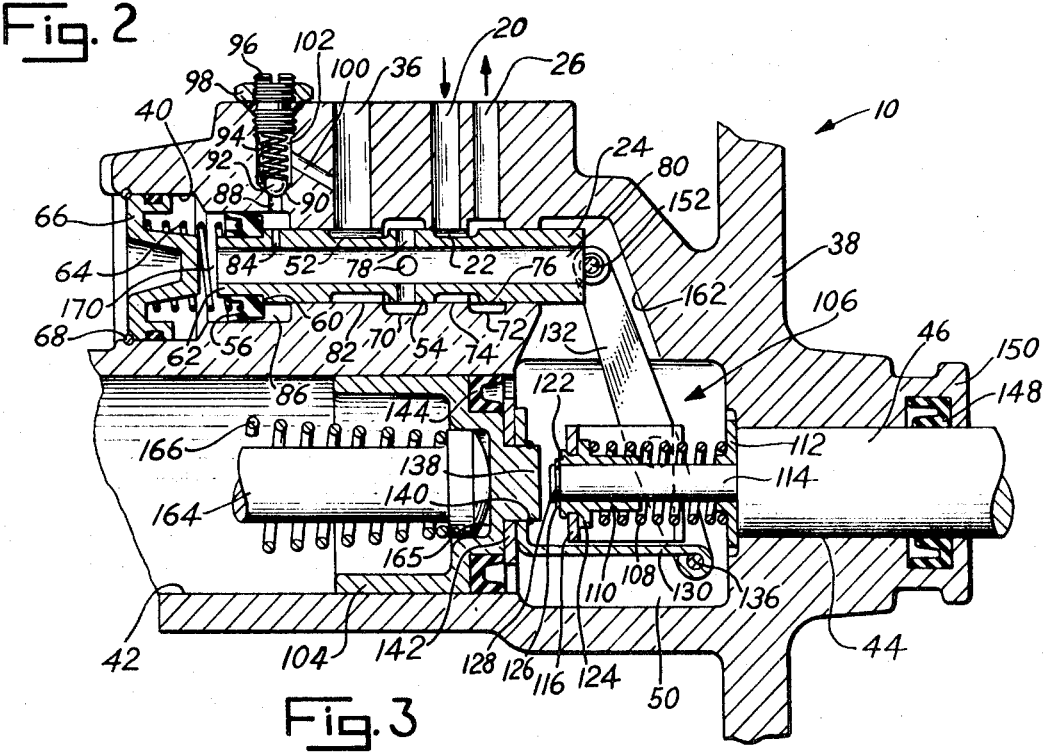
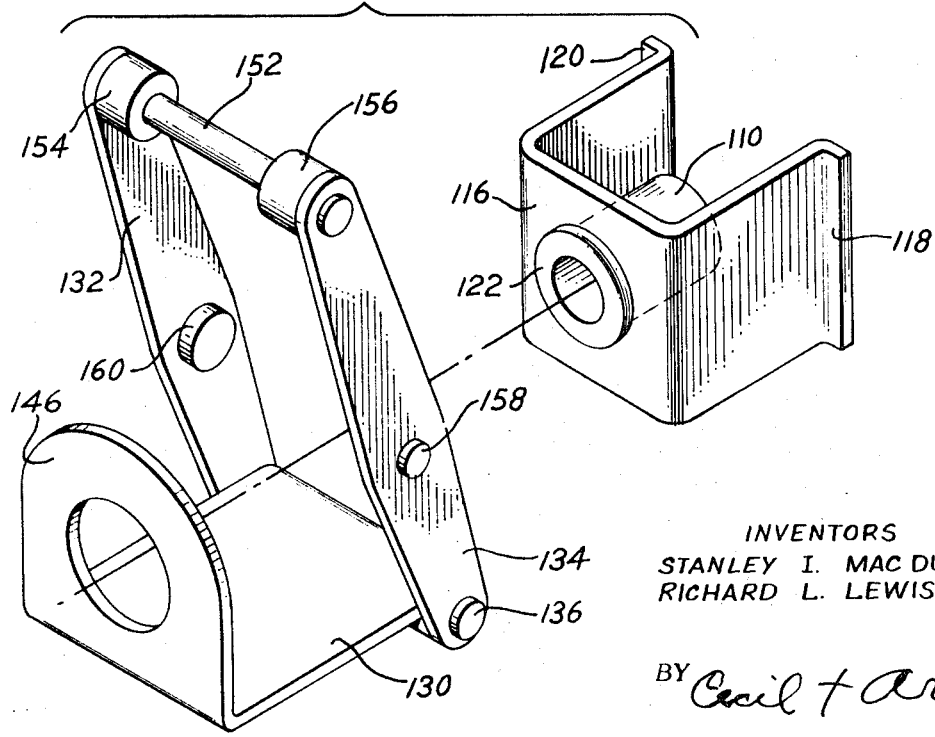
INVENTORS
STANLEY I. MAC DUFF,
RICHARD L. LEWIS
BY *Cecil f Arens*
ATTORNEY 3,603,209

HYDRAULIC BRAKE BOOSTER

SUMMARY

This invention is visualized for use with a hydraulic brake booster intended to utilize the fluid delivered by a conventional power steering pump on most automobiles today. The unit is intended to be installed between the pump and the power steering gear and incorporates what those skilled in the art will readily recognize as a flow through or series parallel valve arrangement. An example of this type of arrangement is seen in the U.S. Pat. Nos. 2,517,005 and 3,119,235 assigned to the common assignee for this invention.

Many attempts have been made with reference to such prior art mechanisms to operate similar power brake apparatus by lever means so that proper ratios can be designed for powered and manual application of brake pressure. Such can be seen in U.S. Pat. Nos. 2,776,732 and 3,267,663 also assigned to the common assignee of this invention.

It is, however, a principal object of this invention to provide a more practical device for providing a hydraulic booster capable of manual actuation with a means to render it usable within any system regardless of boost pressure requirements and with means to accommodate the desired efforts needed for manual operation that permit a reduction of these efforts during power operation.

DRAWING DESCRIPTION

Other objects and advantages will appear to those skilled in the art from the following description of the drawings in which:

FIG. 1 is an illustration showing a preferred utilization for our invention in a hydraulic system for an automotive vehicle;

FIG. 2 is a partial cross section of the brake booster mechanism of FIG. 1 incorporating the details of our invention; and FIG. 3 is an isometric view of the details of our invention related to the lever mechanism to provide reduced pedal ratio when the booster is operating with normal power supply and accommodating a higher pedal ratio under a failed condition of power supply for actuating a brake master cylinder.

DETAILED DESCRIPTION

While the invention can be readily applied to hydraulic controls for machines, aircraft, vessels, etc. it has particular advantages within automotive vehicles wherein it is a desirable replacement for vacuum power brake apparatus.

Present day automobile manufacturers in their desire to increase passenger comfort and safety would appear to be forcing a change in power brake devices. Essentially two things appear to prohibit future application of vacuum boosters. These are the steady progress toward disc brake equipped automobiles, and the employment of smog controls which will reduce the engine intake manifold vacuum level. Both of these factors will require by themselves a larger package for vacuum boosters; and, as they will likely be coupled in the near future, the vacuum booster package will not permit its mounting in the already crowded engine compartment.

It is no secret that many before have realized these design factors as witnessed by the many prior art patents for hydraulic power braking systems such as is illustrated by those mentioned above. However, it is seen that still more improvements are necessary to provide such systems which must accommodate the numerous vehicle types and also the driving public which is equally varied.

Therefore, this invention is shown to include a hydraulic booster 10 for a master cylinder 12 that is installed in a vehicle between a power steering pump 14 and a power steering gear 16. In such a system fluid flow is from pump 14 via conduit 18 to an inlet 20 for booster 10. The fluid flows through the booster 10 via a groove 22 in a spool valve 24 (see FIG. 2) to a port 26 and thence, via a conduit 28 to the power steering gear 16. As the gear 16 is controlled by an open center valve, not shown but within the knowledge of those skilled in the art, the fluid returns normally via a conduit 30 to the pump reservoir. Conduit 30 is provided with a T-fitting 32 to which a conduit 34 from a return port 36 of booster 10 is assembled.

Referring now to FIG. 2 specifically the construction details of the booster 10 involving the features of this invention are shown within a booster housing 38. The housing is formed or machined to have a valve bore 40 and a piston bore 42, the latter of which is aligned with a bore 44 for a push rod 46 connected to a brake pedal 48 (see FIG. 1) and spaced therefrom by a control pressure chamber 50.

Spool valve 24 with grooves 22 and 52 spacing a land 54 is inserted within the bore 40 and a lip seal 56 is placed on the left end of valve 24 against a shoulder 60 thereof. The inner opening of the lip seal is sized to permit such assembly and yet frictionally connect with annular boss 62 of the spool 24. A light valve spring 64 is laid within the lip seal 56 and a plug 66 is inserted into bore 40 to seal it and provide a base for spring 64 causing it to urge valve 24 to the right, as viewed in FIG. 2 when assembled to housing 38, as by snap ring 68.

Housing 38 is provided wit grooves 70 and 72 spacing a land surface 74 to cooperate with land 54 and surface 76 of the spool 24 in tapping fluid flow from port 20 to port 26 for radial passages 78 leading into axial passage 80 through spool 24. Surface 82 of bore 40 is machined to control in cooperation with land 54 the communication of port 36 with passage 80 via passages 78. Also spool 24 is provided with an orifice 84 behind shoulder 60 to control pressure communication to chamber 86 behind seal 56 in bore 40. Chamber 86 has a radial passage 88 leading therefrom to a valve seat 90 on which a ball valve 92 is biased by a spring 94 whose force is adjustable by means of bolt 96 upon loosening of locknut 98. An angular passage 100 is drilled between chamber 102 behind ball 92 and reservoir or return port 36. This completes the subassembly of the valving details.

Next, booster piston 104 and a valve-actuating mechanism 106 is assembled via piston bore 42. However, these parts are assembled first by caging a spring 108 between spring bearing means 110 and 112 on the small end 114 of push rod 46. Means or collar 110 has a U-shaped bracket 116 with outward flanges 118 and 120 (see FIG. 3) held thereto by rolling over end 122 to contain bracket 116 onto flange 124 forming the bearing surface for spring 118. The caging and also a preloading of spring 108 is then completed by snap ring 126 placed within groove 128 of rod end 114.

A bracket 130 having laterally spaced levers 132 and 134 (see FIG. 3) connected thereto by a pin 136 is then connected to a boss 138 of piston 102 by a snap ring 140. A seal retainer plate 142 and a seal 144 is, however, placed on the piston first to be thereby retained by the forward face 146 of the bracket 130 and the snap ring 138.

First the push rod 46, after assembly of seal 148 in groove 150 of housing 38 is inserted from bore 42 into bore 44 until plate 112 abuts housing 38. Then the assembly of piston 102 and bracket 130 is inserted with the spaced levers laying at an angle. As seen in FIG. 3, the levers 132 and 134 are connected at their uppermost ends by a pin 152 having raised portions or sleeves 154 and 156 inwardly of and adjacent the levers 132 and 134, respectively; and each of these levers is, respectively also, provided with pins 158 having large heads 160 facing each other inside the levers 132 and 134.

As the piston assembly is slid into the housing 38 the raised portions 154 and 156 contact the angular surface 162 of housing 38 and pivot back as bracket 130 is slid under bracket 116 to contact the right end of spool 24 as the heads 160 contact the flanges 118 and 120 of bracket 116. The booster assembly is then completed by inserting a push rod 164 into a recess 165 of piston 102 and placing a spring 166 thereagainst with the other end of spring 166 being held by a snap ring or the like (not shown) at the opening of bore 42 from housing 38. Master cylinder 12 is then bolted, as by bolts 168 seen in FIG. 1, to the thus assembled booster 10.

OPERATION

When the vehicle operator depresses the brake pedal, the rod 46 moves to the left viewing FIG. 2. Since the spring 108 is strong enough to maintain the flange 124 on rod 46 in engagement with the U-shaped bracket 116, movement of the rod 46 pivots the levers 132 and 134 about pin 136 to shift the valve 24 to the left viewing FIG. 2. As the valve 24 shifts, land 54 on the valve engages surface 82 on the housing to terminate flow of fluid from the groove 70 into the groove 52, thereby preventing flow of fluid from the chamber 50 to the return port 36. As the valve 24 is shifted further, an orifice is opened between the grooves 22 and 70 to communicate a portion of the fluid flowing into the inlet port 20 to the chamber 50 through passages 78 and 80. As is apparent to those skilled in the art, the pressure drop across the orifice between the grooves 22 and 70 is proportional to the size of the orifice. Therefore, if the vehicle operator increases the force applied to the control rod 46, the valve 24 will be shifted to the left to increase the size of the orifice to reduce the pressure drop thereacross, and therefore, increasing the pressure level in the chamber 50. On the other hand, if the force on the rod 46 is reduced, the spring 64 urges the valve 24 to the right (viewing FIG. 2), reducing the size of the orifice to increase the pressure drop thereacross, thereby reducing the fluid pressure level in the chamber 50. After the valve 24 is shifted initially, it does not move unless the force on the rod 46 is changed as described above. The fluid admitted into the chamber 50 shifts the piston 104 to develop pressure in the motor cylinder in the conventional manner. The piston 104 continues to move until the pressure level in the master cylinder is sufficient to balance the force due to fluid pressure in chamber 50 acting on piston 104. Movement of piston 104 then ceases, unless the input force on rod 46 is increased. When the vehicle operator releases the brake pedal, springs 64 and 166 return the valve 24 and piston 104 to their respective brake release positions.

As the piston 104 is urged to the left, pin 136 moves with the piston, thereby rotating the levers 132 and 134 about the pin 152. Since the U-shaped bracket 116 is also secured to the levers 132, 134, the control rod 46 also follows the movement of the piston. However, since the pins 158 are much closer to the pin 152, which is the axis of rotation of the levers, than is the pin 136, the control rod 46 will move a proportionally shorter distance than does the piston 104. If a malfunction in the valve 24 or in the pressure source terminates fluid communication into the chamber 50, spring 108 yields when the rod 46 is moved to permit the end of the rod 46 to engage the boss 138 on the piston, to provide a mechanical link between the brake pedal and the master cylinder so that the latter may be actuated manually. When the master cylinder is actuated manually, the rod 46 moves the same distance that the piston 164 moves. As described above, during a power brake application, the rod 46 moves a proportionally shorter distance than does the piston 104. This feature permits full use of the mechanical advantage provided by the brake pedal during a manual brake application while providing relatively short pedal travel during a power brake application.

As described above, when the valve 24 is shifted after a brake actuation is initiated, fluid is communicated through the passages 78 and 80 to the chamber 50. Fluid is also communicated through passage 80 to a reaction chamber 170 at the left end of spool 24 and from the chamber 170 to the chamber 86 through the orifice 84 to equalize the pressure on the valve 24. The pressure drop across orifice 84 will serve to dampen the movement of valve 24 in that the pressure chamber 170 will initially be unbalanced.

The operator feels the braking effort due to pressure in control chamber 50 being reactive on rod 46 as it is projected thereinto. The power steering pump 14 (FIG. 1) is conventionally provided with a relief valve (not shown) set at a pressure designed to protect the system while providing the maximum design pressure to the steering gear. The power brake booster 10 must not be permitted to operate in a way which will prevent flow to the steering gear. To insure that this does not happen, whenever boost pressure in chamber 50 has reached a predetermined value somewhat less than the pump relief valve setting ball valve 92 is opened thereby establishing fluid flow from the chamber 86 to the reservoir port 36. At the same time flow is established through the restricted orifice 84. The orifice restriction results in a pressure drop so that the brake booster chamber pressure is slightly higher than the pressure in the chamber 86. This permits hydraulic pressure in chamber 170 to lap the valve 24 or open the control chamber 50 via land 54 to the reservoir port, as is required assuring continued flow through port 26 to the steering gear. The seating force on ball 92 can be regulated by screw or bolt 96 such that the maximum control pressure can be adjusted to approximately 100 p.s.i. less than the power steering pump relief valve pressure.

Having set forth an operative construction for this invention it is now desired to complete this disclosure the following claims:

1. In a brake booster:
a housing defining a chamber therewithin;
a piston slidable in said chamber;
valve means for controlling fluid communication between a source of fluid pressure and said chamber for shifting said piston;
operator-operated control means for operating said valve means;
mechanism operably connecting the control means, the piston, the the valve means for opening the latter upon shifting of the control means;
said mechanism including lever means extending between said piston and said valve means, first pivot means connecting said lever means to said piston, second pivot means connecting said lever means to said control means, and third pivot means connecting said lever means to said valve, said second pivot means being disposed between said first and third pivot means, thereby permitting said piston to move a proportionally greater distance than said control means moves when the latter is shifted and fluid is communicated to said chamber, but permitting the control means to move a distance equal to that traveled by the piston when the control means is shifted and a malfunction prevents fluid communication into said chamber.

2. The invention of claim 1:
said mechanism including yieldable means operably coupling said control means to the lever means to permit relative movement therebetween when said malfunction occurs.

3. The invention of claim 2:
said control means and said piston being substantially coaxial to permit said control means to engage the end of the piston upon relative movement between the control means and the mechanism.

4. The invention of claim 1, and:
a bracket extending from said piston;
said first pivot means connecting one end of said lever means to said bracket.

5. In a brake booster:
a housing defining a chamber therewithin;
a piston slidable in said chamber;
valve means for controlling fluid communication between a source of fluid pressure and said chamber for shifting said piston; and
an operator-operated control means for operating said valve means; and
mechanism operably connecting the control means, the piston and the valve means for opening the latter upon shifting of the control means;
said mechanism including means yieldably coupling said control means to the mechanism for movement therewith when the booster operates normally, said mechanism permitting said control means to move a proportionally smaller distance than said piston shifts during said normal operation of the booster, said coupling means yielding to permit the control means to move relative to said mechanism when a malfunction prevents a fluid communication into said chamber, said control means thereafter traveling a distance substantially equal to that traveled by the piston.

6. The invention of claim 5:

said control means and said piston being substantially coaxial to permit said control means to engage the end of the piston upon relative movement between the control means and the mechanism.

7. The invention of claim 5; and abutments means on said control means;

said mechanism including a bracket carried by said piston, lever means pivotally connected to said bracket and to said valve means, a caging member slidable on said control means, means pivotally connecting the caging member to said lever means, and resilient means yieldably urging said caging member into engagement with said abutment means.

8. The invention of claim 7:

said control means and said piston being substantially coaxial to permit said control means to engage the end of the piston upon yielding of the resilient means.

9. The invention of claim 5; and abutment means on said control means;

said mechanism including a bracket carried by said piston, lever means, first pivot means connecting the bracket to the lever means, second pivot means connecting the lever means to the valve means, a caging member slidable on said control means, third pivot means pivotally connecting said caging member to said lever means at a point between said first and second pivot means, and resilient means yieldably urging said caging member into engagement with said abutment means.

10. A power boost comprising:

a housing having a valve bore and another bore communicable via a control chamber, said housing having port means for said valve bore;

valve means in said valve bore controlling communication of said port means and said control chamber;

piston means in said another bore and controlled by fluid pressure in said control chamber;

means to actuate said valve means and said piston means inclusive of a mechanism to reduce actuating efforts on said valve means relative to that possible for said piston means; and means to dampen movement of said valve means to prevent its overshooting the travel scheduled by said means to actuate said valve means including an orifice between the control chamber and a balancing chamber about said valve means whereby initial fluid pressure is unbalanced towards opposing movement of said valve means.

11. The structure of claim 10 and further comprising a relief valve means for said balancing chamber to relieve control pressures above a predetermined value without increasing fluid flow via said control chamber.

12. The structure of claim 11 and further comprising means adjustable exteriorily of said housing for regulating the operation of said relief valve.

13. A power boost means having a power valve for controlling a piston with means to limit control pressure thereon and having an actuation means characterized by the improvement of a lever mechanism; and operator-operated push rod; and a spring biased means caged to said push rod to operate said lever mechanism with reduced efforts as compared to that available to operate said piston upon abutment therewith of said push rod, said push rod being adapted to transmit feel of powered and nonpowered operation of said piston.

14. A power boost comprising:

a housing having a valve bore and another bore communicable via a control chamber, said housing having port means for said valve bore;

valve means in said valve bore controlling communication of said port means and said control chamber;

piston means in said another bore and controlled by fluid pressure in said control chamber; and means to actuate said valve means and said piston means inclusive of a mechanism to reduce actuating efforts on said valve means relative to that possible for said piston means;

said means to actuate said valve means and said piston means including lever means pivoted to a bracket attached to said piston means within which a bracket of a caged spring assembly is slidable to first operate said valve means, via a fulcrum intermediate an attachment point and a valve operating end of said lever means, and thereafter abut said piston means to mechanically actuate same in absence of sufficient fluid pressure in said control chamber to resist same.

UNITED STATES PATENT OFFICE
CERTIFICATE OF CORRECTION

Patent No. __3,603,209__  Dated __September 7, 1971__

Inventor(s) __Stanley I. Mac Duff, et. al.__

It is certified that error appears in the above-identified patent and that said Letters Patent are hereby corrected as shown below:

Column 1, line 19, "2,776,732" should read -- 2,766,732 -- .

Signed and sealed this 27th day of March 1973.

(SEAL)
Attest:

EDWARD M. FLETCHER, JR.  
Attesting Officer

ROBERT GOTTSCHALK  
Commissioner of Patents